United States Patent [19]

Banning et al.

[11] Patent Number: 4,954,669
[45] Date of Patent: Sep. 4, 1990

[54] COAXIAL CABLE CONNECTOR ASSEMBLY

[75] Inventors: Harmon W. Banning, Derwood, Md.; Daniel C. Neil, Newark, Del.

[73] Assignee: W. L. Gore & Associates, Inc., Newark, Del.

[21] Appl. No.: 301,575

[22] Filed: Jan. 25, 1989

[51] Int. Cl.⁵ .............................................. H02G 15/02
[52] U.S. Cl. .................................. 174/75 C; 439/314; 439/320; 439/578
[58] Field of Search .......................... 174/75 C, 75 R; 439/578, 312, 314, 320

[56] References Cited

U.S. PATENT DOCUMENTS

| | | | |
|---|---|---|---|
| 2,520,705 | 8/1950 | Wittlinger | 174/75 C |
| 2,777,894 | 1/1957 | Arbeiter et al. | 174/75 C |
| 2,870,420 | 1/1959 | Malek | 174/75 C |
| 4,557,546 | 12/1985 | Dreyer | 439/320 X |
| 4,731,502 | 3/1988 | Finamore | 174/74 R |
| 4,741,702 | 5/1988 | Yasumoto | 439/578 X |
| 4,772,223 | 9/1988 | Yasumoto | 439/578 |

Primary Examiner—Morris H. Nimmo
Attorney, Agent, or Firm—Dena Meyer Weker

[57] ABSTRACT

This invention relates to a coaxial cable connector assembly in which a coaxial transmission line terminator is attached to an armor sheath and bushing. This assembly provides for easy adjustment so that the length of the coaxial transmission line matches the length of the protective armor. The invention provides for a coaxial cable and terminator, the coaxial cable, a metallic braid, and a cable terminator having a void space capable of receiving an end of the coaxial cable and a jacket surrounding substantially all of the braid of the cable and abutting the cable terminator.

9 Claims, 3 Drawing Sheets

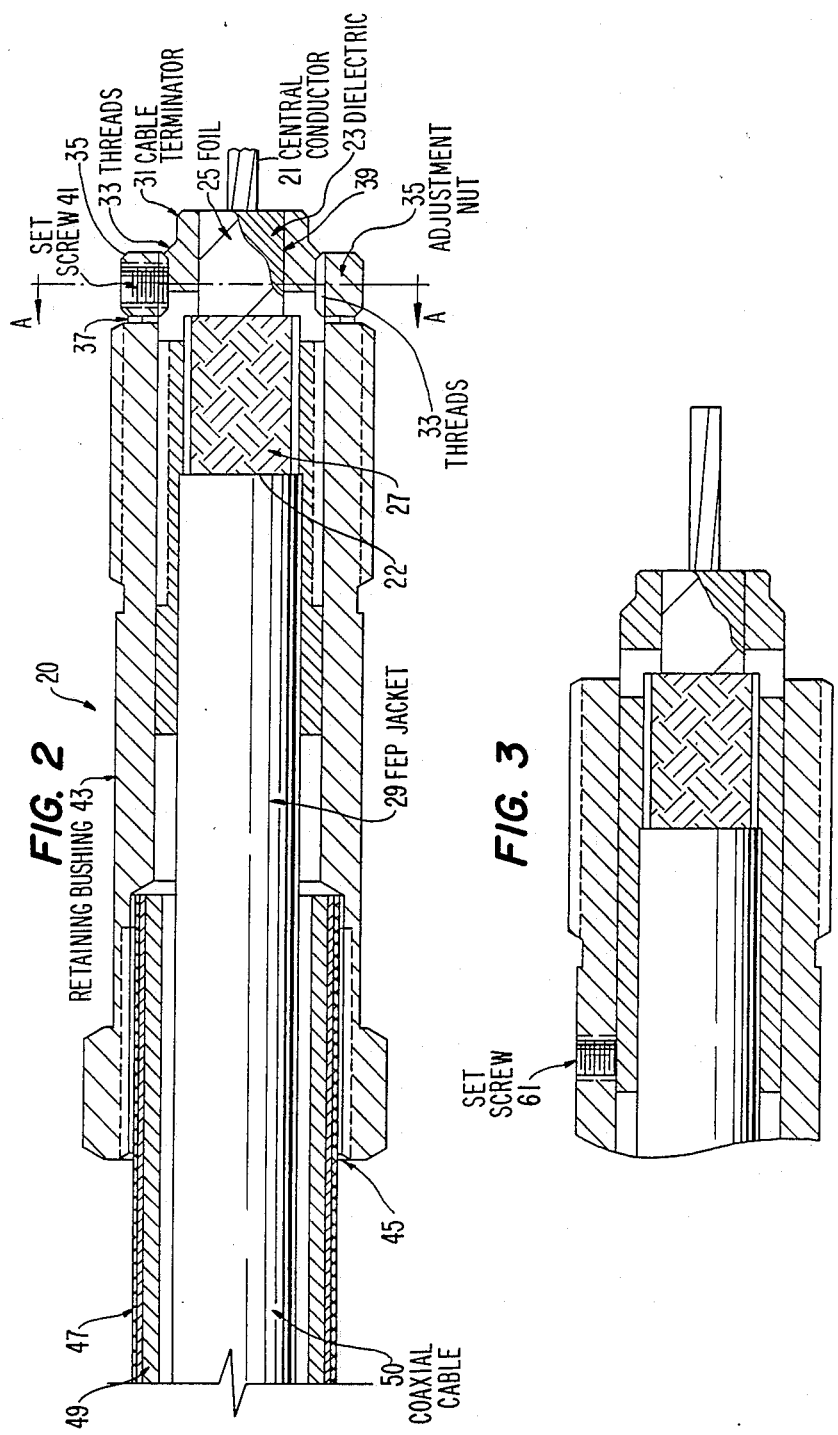

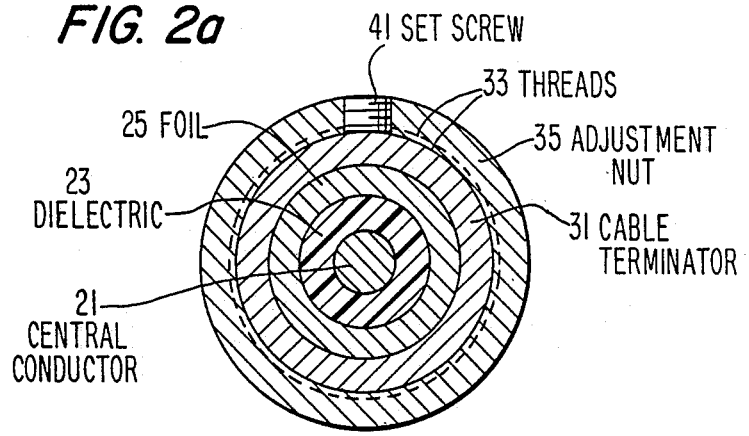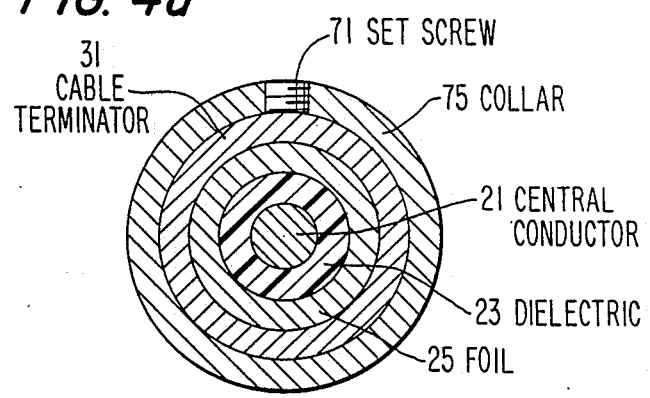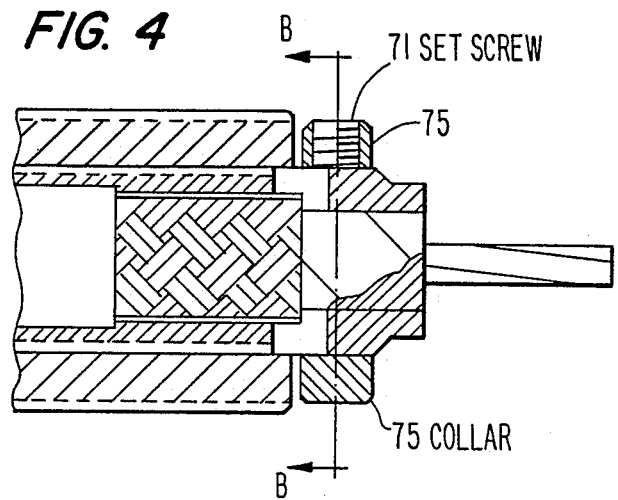

COAXIAL CABLE CONNECTOR ASSEMBLY

FIELD OF THE INVENTION

This invention relates to a coaxial cable connector assembly in which a coaxial transmission line terminator is attached to an armor sheath and bushing. This assembly provides for easy adjustment so that the length of the coaxial transmission line matches the length of the protective armor.

BACKGROUND OF THE INVENTION

Coaxial cable sometime requires an armor sheath to protect and provide resistance from crushing forces and to prevent the cable from twisting and bending. These armor sheaths are generally flexible yet rigid in the transverse plane to ensure protection against crush resistance and provide resistance to torsion. An example of a coaxial transmission line with an armor sheath is described in U.S. Pat. No. 4,731,502. This patent teaches the use of a helically-wound metallic armor sheath having interlocking edges and grooves between its joint to protect the microwave coaxial transmission line.

While these protective sheaths provide increased protection to the overall cable, in certain situations during construction, the center conductor and inner layers of the coaxial may be altered in length due to elongation or compression causing an unsatisfactory fit between the cable and the armor sheath and undesirable stresses to the cable. As a result, the length of armor sheath must then be modified to compensate for changes in length of the inner cable layers. This often requires correction by trial and error.

FIG. 1 illustrates an existing solution to compensate for changes in length to protect the inner layers by use of a wedge shaped restrainer. This restrainer protects the layers from stresses while the armor sheath is constructed around the cable. FIG. 1 shows a cross-section of an existing connector assembly used for armor-protected cable. A cone shaped restrainer 1 holds the center conductor and insulation 3, inner braid 9, and outer conducting foil 15 within restraining bushing 7. The bushing has a tapered bore to receive the restrainer 1. A layer of outer braid 21 surrounding the armored cable 11 is brazed in the counterbored region 19 of the bushing with the aid of solder preform 13, made of a material such as AWS classification BA9-24 silver brazing alloy. In this application removal of the cable from the armor is no longer possible. It is often desirable to remove the cable from the armor for repair or replacement. In this application, a weakness exists in region 17 since the braided layer 9 is separated from the remainder of the inner construction. It is at this point that any change in length between the armor and cable are absorbed usually at the expense of disturbance of the outer conducting foil 15.

A further complication is that the tapered regions of the restrainer 1 and bushings 7 are more costly to manufacture than straight sections, especially in this case since the inner and outer tapers must match precisely to perform properly.

There is a need for a means for compensating an undesirable differential in the length of a protective armor sheath with respect to the cable it is protecting. There is also a need for a means for removing a cable from its protective armor sheath in order to repair or replace the cable.

SUMMARY OF THE INVENTION:

A coaxial cable connector assembly System is provided which allows for compensating an undesirable differential in length between the armor sheath and the cable it is protecting. The connector also provides a means for removing a cable from its protective armor for repair or replacement of cable.

The present invention provides for a coaxial cable and terminator, the coaxial cable further comprising a center conductor, layer of dielectric material preferably porous PTFE, an outer conductor, and a metallic braid surrounding the outer conductor and a cable terminator having smooth inner surfaces and a void space capable of receiving an end of the coaxial cable, and a jacket surrounding substantially all of the braid of the cable and abutting the cable terminator.

A removable coaxial cable connector assembly is also provided with a coaxial cable and terminator and an armor system comprising an armor sheath, stainless steel braid, retaining bushing and restraining means to hold the coaxial cable and terminator within the armor system.

BRIEF DESCRIPTION OF THE DRAWINGS:

FIG. 2 shows a cross-section of the coaxial cable connector assembly in accordance with the present invention.

FIG. 2a shows an end view along line A—A of FIG. 2 of the coaxial cable connector assembly.

FIG. 3 shows a cross-section of an alternative embodiment of the present invention.

FIG. 4 shows a cross-section of a third alterative embodiment of the present invention.

FIG. 4a shows an end-view of FIG. 4 along line B—B.

Figure 1:
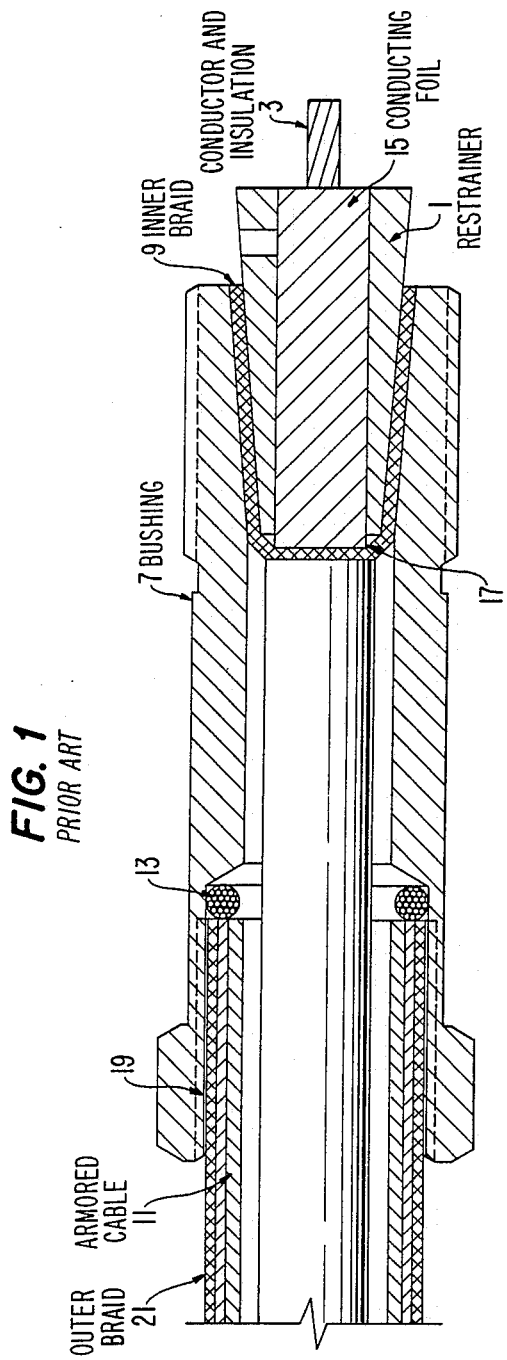
FIG. 1 shows a cross-section of existing connectors used with cable and protective armor sheaths.

DESCRIPTION OF THE PREFERRED EMBODIMENTS:

The coaxial cable connector assembly for the invention will now be described with reference to FIG. 2.

This figure is a cross-section of the connector assembly 20.

A coaxial cable 50 is first prepared in the following manner. central conductor 21 usually made of silver plated copper wire or silver plated stainless steel with a round cross-section is enclosed in a dielectric material 23 made from a porous polymeric material preferably porous polytetrafluoroethylene (hereinafter PTFE) such as that disclosed in U.S. Pat. Nos. 3,953,566 and 4,187,390. Any dielectric material however is suitable in this assembly. The dielectric material 23 may be applied using conventional technology by either wrapping or extrusion onto the center conductor 21. A layer of foil 25 made of silver plated copper is then helically wrapped around the dielectric material 23 using conventional technology. The foil 25 performs as the outer conductor of the cable. A braid 27 is then applied over the foil 25 by conventional braiding technology. One or more braiding layers may be applied. FIG. 2 illustrates only one layer for this embodiment.

A cable terminator 31 is constructed of a metal part having smooth inner surfaces and void spaces to receive the end of the coaxial cable 50. The terminator is rigidly affixed preferably soldered to the foil 25 and to the inner woven braid 27 with a soft solder 39 such as lead tin solder. The terminator may optionally have threads at the outer surfaces 33. A Jacket 29 of extruded fluorocarbon, for example, is then applied over the braided layer of the cable so that the end of the jacket abuts the end of the inner edge of the terminator 22, as shown in FIG. 2.

The armor system comprising retaining bushing, armor sheath and braid is also shown in FIG. 2. A braid or multiple braids of stainless steel 47 is applied over an armor sheath 49 made of crush resistant material such as stainless steel using conventional braiding technology. The armor sheath 49 has a hollow longitudinal core of sufficient diameter to receive the coaxial cable. This armor sheath and braid are then brazed to a retaining bushing 43 having an opening and inset 45 at one end to receive and contain the end of the armor system. The retaining bushing has an opening of sufficient size to also receive the cable and terminator.

The cable 50 and soldered terminator 31 are slid within the armor system and retaining bushing. The cable and terminator may be adjusted to either elongate or retract to compensate for the size of the armor system. The terminator may either be slid or be screwed if threaded to the bushing when adjusting for length.

The cable and terminator are then held in place within the armor system and bushing by any restraining means.

FIG. 2 shows the restraining means to be at least one adjustment nut 35 that restrains the terminator at an optimum location that is determined by first stretching the armor system to its intended position and restraining it while turning the nut 35 to its closed position. The set screw 41 is used to lock the adjustment nut 35 to the cable terminator. A lock washer 37 is optionally provided to prevent the cable from twisting when the terminator and cable is attached to the retaining bushing.

FIG. 2a shows an end view of the cable and terminator along line A—A of FIG. 2.

A second restraining means includes a set screw 61 that restrains the terminator in the bushing as shown in FIG. 3. Other alternative restraining means include collar 71 and set screw 75 as shown in FIG. 4 and FIG. 4a or alternatively press fitting the bushing to restrain the cable and terminator.

The use of this terminator-cable assembly and restraining bushing-armor system permits a simple method for adjusting and compensating for any undesirable differential in the length of the armor with respect to the cable. Considerable range of adjustment such as between 0.25 to 0.5 inches is possible with this system.

It will be apparent to those skilled in the art that various modifications and variations can be made without departing from the scope of this invention.

What is claimed is:
1. A coaxial cable and terminator comprising: (a) A coaxial cable further comprising:
　　1. a central conductor,
　　2. a layer of dielectric material surrounding said central conductor,
　　3. at least one layer of foil as an outer conductor surrounding said dielectric material,
　　4. a braid of metallic material surrounding said outer conductor, and
(b) a cable terminator having smooth inner surfaces and a void space capable of receiving an end of said coaxial cable, said terminator rigidly attached to the braid and foil, and
(c) a jacket further surrounding substantially all of the braid of said coaxial cable and which abuts said cable terminator.
2. The coaxial cable and terminator of claim 1 wherein said coaxial cable has a central conductor of silver plated copper wire, an outer conductor of silver plated copper ribbon, and a braid of silver plated copper wire.
3. The coaxial cable and terminator of claim 1 wherein said coaxial cable has a central conductor of silver palted stainless steel wire, a foil of silver plated fibbon and a braid of silver plated stainless steel wires.
4. The coaxial cable and terminator of claim 1 wherein said dielectric of coaxial cable is comprised of a porous polymeric material.
5. The coaxial cable and terminator of claim 4 wherein said porous polymeric material is porous polytetrafluoroethylene.
6. A removable coaxial cable connector assembly comprising:
(a) a coaxial cable and terminator,
(b) an armor system further comprising:
　　1. an armor sheath having a hollow longitudinal core to receive said coaxial cable,
　　2. a braid of stainless steel surrounding said armor sheath, and
　　3. a retaining bushing having an opening and inset to receive and contain the end said armor or sheath and braid said retaining bushing rigidly affixed to the braid, and
(c) a restraining means to rigidly hold the coaxial cable and terminator within said armor system.
7. A coaxial cable connector assembly as described in claim 6 wherein said restraining means comprises an adjustment nut and set screw.
8. A coaxial cable connector assembly as described in claim 6 wherein said restraining means comprises a collar and set screw.
9. A coaxial cable connector assembly as described in claim 6 wherein said restraining means comprises a set screw in the brushing.

* * * * *